United States Patent [19]

Raistrick

[11] Patent Number: 4,876,115
[45] Date of Patent: Oct. 24, 1989

[54] ELECTRODE ASSEMBLY FOR USE IN A SOLID POLYMER ELECTROLYTE FUEL CELL

[75] Inventor: Ian D. Raistrick, Los Alamos, N. Mex.

[73] Assignee: United States Department of Energy, Washington, D.C.

[21] Appl. No.: 163,672

[22] Filed: Mar. 3, 1988

Related U.S. Application Data

[62] Division of Ser. No. 9,843, Jan. 30, 1987, abandoned.

[51] Int. Cl.[4] .............................................. H01M 4/86
[52] U.S. Cl. ...................................... 427/115; 429/42
[58] Field of Search ..................... 429/42, 44; 427/115

[56] References Cited

U.S. PATENT DOCUMENTS 4,112,149  9/1978  Babinsky .............................. 427/115

Primary Examiner—Sam Silverberg
Attorney, Agent, or Firm—Ray G. Wilson; Paul D. Gaetjens; Judson R. Hightower

[57] ABSTRACT

A gas reaction fuel cell may be provided with a solid polymer electrolyte membrane. Porous gas diffusion electrodes are formed of carbon particles supporting a catalyst which is effective to enhance the gas reactions. The carbon particles define interstitial spaces exposing the catalyst on a large surface area of the carbon particles. A proton conducting material, such as a perfluorocarbon copolymer or ruthenium dioxide contacts the surface areas of the carbon particles adjacent the interstitial spaces. The proton conducting material enables protons produced by the gas reactions adjacent the supported catalyst to have a conductive path with the electrolyte membrane. The carbon particles provide a conductive path for electrons. A suitable electrode may be formed by dispersing a solution containing a proton conducting material over the surface of the electrode in a manner effective to coat carbon surfaces adjacent the interstitial spaces without impeding gas flow into the interstitial spaces.

4 Claims, 2 Drawing Sheets

ELECTRODE ASSEMBLY FOR USE IN A SOLID POLYMER ELECTROLYTE FUEL CELL This is a division of application Ser. No. 009,843, filed Jan. 30, 1987, now abandoned.

BACKGROUND OF THE INVENTION

This invention is directed to electrode assemblies and, more particularly, to electrode assemblies for use with fuel cells having solid polymer electrolytes. This invention is the result of a contract with the Department of Energy (Contract No. W-7405-ENG-36).

A fuel cell is a device which converts the energy of a chemical reaction into electricity. It differs from a battery in that the fuel and oxidant are stored external to the cell, which can generate power as long as the fuel and oxidant are supplied. The present invention relates to fuel cells in which the fuel is hydrogen and the oxidant is air or oxygen. Protons are formed by dissociation of $H_2$ at the anode and pass through the electrolyte from anode to cathode. Electrons produced in the dissociation flow in the external circuit to the cathode, driven by the difference in electric potential between the anode and the cathode and can therefore do useful work.

Fuel cells can be classified by the type of electrolyte, i.e., liquid or solid, that they contain. The present invention relates to fuel cells in which the electrolyte is a solid polymer, also known as a proton exchange membrane. One copolymeric ion exchange membrane used as a fuel cell solid electrolyte is a perfluorocarbon material sold under the trademark Nafion ® by E. I. duPont Nemours. The use of Nafion ® as a solid polymer electrolyte membrane is more particularly described in U.S. Pat. No. 4,469,579, incorporated herein by reference.

Fuel cells using a solid electrolyte offer several potential advantages over liquid electrolyte fuel cells. These advantages include greater ultimate power density, lower operating temperature, and longer lifetime. Solid electrolytes also have the advantages of lack of corrosion, ease of construction, and low vapor pressure. Nafion ® particularly provides improved oxygen reduction kinetics.

The anode and cathode half-cell $H_2$ and $O_2$ reactions require catalysts to proceed at useful rates. In acid electrolyte fuel cells a suitable catalyst is platinum, or one of the other noble metals such as palladium. The catalyst is provided as very small particles (20–50 Å) which are distributed on, and supported by, larger microscopic carbon particles to provide a desired catalytic loading. Electrodes are formed from the catalyzed carbon particles and designed to optimize contact between the electrolyte, the gaseous fuel and oxidant materials, the catalyst, and an electrically conducting current collector. The electrodes must be porous where gaseous materials are involved and efficient porous gas diffusion electrodes have been developed for fuel cells using a liquid electrolyte such as phosphoric acid. These electrodes require relatively small quantities of the expensive catalyst materials. Platinum loadings for use with liquid electrolytes are about 0.3–0.5 mg/cm$^2$ of electrode area.

Supported catalyst porous gas diffusion electrodes have not been successfully used with solid polymer electrolyte fuel cells, since only very low current densities have been obtained. The electrodes presently used with solid polymer electrolyte fuel cells are constructed differently than liquid electrolyte electrodes. Instead of using very small particles of noble metals, dispersed on a high surface area carbon support, a catalyst/carbon mixture is pressed directly into the surface of the polymer electrolyte. The catalyst loadings with these conventional electrodes for use with solid polymer electrolytes are about ten times higher than the catalyst loadings for porous gas diffusion electrodes used with liquid electrolytes. The great disparity in cost between these two types of electrodes has prevented the realization of the advantages offered by solid polymer electrolyte fuel cells for gas reaction fuel cells.

U.S. Pat. No. 4,469,579 teaches an electrode for use with a sodium chloride brine cell formed from a solvated perfluorocarbon copolymer blended with conductive electrode materials, and may include an ingredient to form pores for passing gases arising from the brine reaction products. A resulting solute dispersion, including relatively large (3×3×3 mm) carbon particles, can be formed as a sheet for application or can be applied directly to a solid polymer separator membrane. While the field of use for the electrode assembly suggests application to fuel cells with liquid reactants, there is no example of such application or of any benefits which might be realized. There is also no teaching about forming a porous structure suitable for use with gaseous fuel materials.

In conventional gas reaction fuel cells, a liquid electrolyte can intimately contact the catalyst and the gas for efficient ion generation and conductive transfer. Relatively low catalytic loadings are needed, e.g., loadings of 0.35 mg/cm$^2$ are typical. Where a solid polymer electrolyte is used, electrode materials, such as a carbon and platinum mixture, have been pressed directly into the surface of the polymer which contacts a liquid reactant. Relatively high catalytic loadings are required, e.g., loadings of 4 mg/cm$^2$ are typical.

The present invention overcomes problems associated with the application of porous gas electrodes to solid electrolyte electrode assemblies and an improved porous electrode structure and a method for forming the structure are provided.

One object of the present invention is to increase the proton transport between the catalytic surfaces within a porous gas diffusion electrode and a solid polymer electrolyte.

One other object of the present invention is to provide a fuel cell electrode having a greatly reduced amount of noble metal catalyst needed for electrodes used with solid polymer electrolyte fuel cells.

Another object of the invention is to successfully use porous gas diffusion electrodes with a solid polymer electrolyte.

Still another object is to enable the conversion of conventional porous gas diffusion electrodes for use with a solid polymer electrolyte.

SUMMARY OF THE INVENTION

To achieve the foregoing and other objects, and in accordance with the purposes of the present invention, as embodied and broadly described herein, in one characterization of the present invention a gas reaction fuel cell is provided with a solid polymer electrolyte membrane for separating anodic and cathodic surfaces. The anodic and cathodic electrodes are porous gas diffusion electrodes formed of carbon particles supporting a catalyst effective to enhance the gas reaction, where the carbon particles define interstitial spaces for diffusing gases for the reaction. A proton conducting material is provided in contact with the carbon particles adjacent the interstitial spaces so that protons are conducted between the electrolyte and the catalyst supported by the carbon particles.

In another characterization of the present invention an electrode assembly is provided for use in a gas reaction fuel cell. A solid polymer electrolyte membrane is provided with first and second opposed surfaces. A porous gas anode contacts the first surface and has a first supported catalyst on surfaces defining first interstitial volumes for diffusing gases for the reaction. A first proton conducting material is disposed in the first interstitial volumes effective to conduct protons adjacent the first catalyst. A porous gas diffusion cathode contacts the second surface and has a second supported catalyst on surfaces defining second interstitial volumes for diffusing gases for the reaction. A second proton conducting material is disposed in the second interstitial volumes effective to conduct protons adjacent the second catalyst.

In yet another characterization of the present invention a method is provided for treating porous gas diffusion electrodes for effective use with a solid polymer electrolyte membrane. A solution is formed containing a proton conducting material. The solution is dispersed over the electrode in a manner effecitve to deposit the proton conductive material on interior surfaces defining pores of the porous electrode.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figures 1, 1A, 1B:
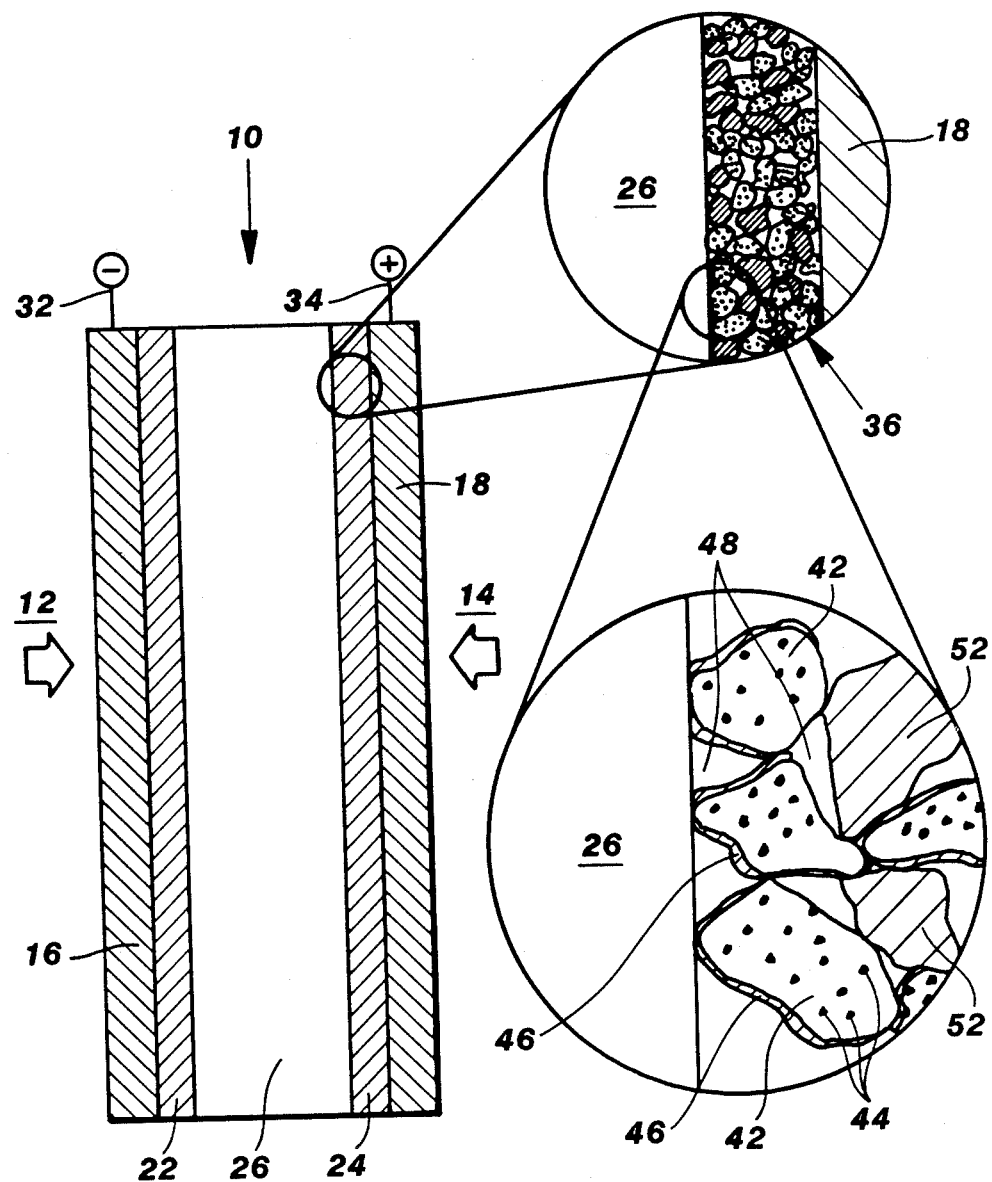
FIG. 1 is a cross section of a fuel cell having an electrode structure in accordance with one embodiment of the present invention.
FIG. 1A is a pictorial illustration showing a magnified view of a portion of FIG. 1.
FIG. 1B is a further pictorial illustration showing a magnified view of a portion of FIG. 1A.

Referring to FIGS. 1, 1A, and 1B, there is shown in pictorial cross section form a fuel cell having an electrode structure according to the present invention. Fuel cell assembly 10 includes gaseous reactants which include a fuel source 12 and an oxidizer source 14. The gases 12, 14 diffuse through anode backing layer 16 and cathode backing layer 18, respectively, to porous electrodes forming anode 22 and cathode 24. Anode 22 is separated from cathode 24 by a solid polymer electrolytic (SPE) membrane 26. SPE membrane 26 provides for ion transport from gas reactions arising in anode 22 and cathode 24. Anode connection 32 and cathode connection 34 are used to interconnect with an external circuit or with other fuel cell assemblies.

Prior art attempts to place porous gas diffusion electrodes on a SPE membrane have not effectively contacted the gas reaction on catalysts supported by carbon particles forming the electrode with the SPE membrane. The present invention has recognized that an efficient matching of a porous gas diffusion electrode with a SPE membrane should provide some mechanism to replace the effect of a liquid electrolyte intimately contacting the catalytic surfaces within the porous electrode structure. As hereinafter described, the present invention provides for placing a proton conducting material within the porous gas diffusion electrode to promote proton transfer adjacent the catalyst sites.

FIG. 1A is a magnified view of cathode 24 of FIG. 1. Porous gas diffusion electrode 36 is supported on cathode backing layer 18 and in contact with solid polymer electrolytic membrane 26. A gaseous reactant diffuses through backing layer 18 and into porous electrode 36.

Referring now to FIG. 1B, a further magnified view of a porous gas diffusion electrode in accordance with the present invention is presented. Support particles 42 are provided for catalyst materials 44 which are preferably dispersed on the surface of support particles 42. Support particles 42 define interstitial pores 48 which enable gases to penetrate within the electrode structure for electrochemical reactions to occur adjacent to catalyst 44.

Additional particles 52 may be provided to control the wetting properties of the electrode and to help maintain porosity and strength. More particularly, Teflon ® (E. I. duPont) is included to provide hydrophobicity and gas access with the electrode.

In the present invention proton conducting material 46 is provided within the structure of porous gas diffusion electrode 36. Proton conductor 46 enables protons to be conducted between catalytic sites 44 on surfaces defining interstices 48 and SPE membrane 26. The catalytic loadings on particles 42 remain the relatively low catalytic loadings associated with liquid electrolytes rather than the high catalytic loadings associated with SPE-membrane electrode assemblies.

Materials effective for SPE membrane 26 are well known. By way of example, U.S. Pat. No. 4,337,137, to Ezzell, teaches a variety of ion exchange membranes, the disclosure of which is incorporated herein by reference. A preferred SPE membrane in the present invention is a perfluorocarbon copolymer, and particularly a material marketed by E. I. duPont under the trademark Nafion ®.

Electrode structures in accordance with the present invention may be formed from conventional porous gas diffusion electrodes. Such electrodes may be formed from particles of high surface area carbon, such as Vulcan XC72 (about 200 m$^2$/g) or Black Pearls 2000 (about 1000 m$^2$/g) available from Cabot, Boston, Massachusetts, which are catalyzed with particles of platinum of 20–50 Å size to a loading of about 0.35 mg/cm$^2$ of electrode surface area. In accordance with the present invention, catalyst loadings can be limited to less than 0.50 mg/cm$^2$. A commercial electrode marketed by Prototech Company, Newton Highlands, Massachusetts, (hereinafter referred to as 'Prototech') for conventional use with liquid electrolytes has been treated as hereinafter described for use with a SPE membrane of Nafion ®.

In accordance with the present invention a proton conducting material is applied to the catalyzed side of the electrode in a manner which effectively deposits the proton conducting material 46 adjacent catalytic sites 44 for effective communication between SPE membrane 26 and reactions occurring on the surface of support particles 46. Proton conducting material has been applied by spraying and by deposit with an applicator onto the surface. Modified porous gas diffusion electrodes have been constructed using two proton conductive materials. In one embodiment a perfluorocarbon copolymer, e.g., Nafion ®, was applied. In another embodiment ruthenium dioxide ($RuO_2$) was deposited from a solution of $RuCl_3$ which was thereafter oxidized to $RuO_2$.

Each of the proton conducting materials may be used for either the anode or cathode. However, it is believed advantageous if the Nafion ® modified electrodes are used for the cathode and the $RuO_2$ modified electrodes are used for the anode.

Electrodes modified with $RuO_2$ were prepared by painting a 1% solution of $RuCl_3$ in isopropanol onto the electrode structure. The electrodes were dried at an ambient temperature and then oxidized at 300° C. for 45 minutes to complete the penetration and oxidation, forming the proton conductive material. Substantially similar performance as Nafion ®-modified electrodes is obtained for a hydrogen oxidation reaction as measured by an overpotential versus current density comparison. The electrodes modified with $RuO_2$ do not, however, show the increase in series resistance with time with respect to the hydrogen oxidation reaction electrode, i.e., the anode, shown by electrodes modified with Nafion ®.

Fuel cell electrodes have also been prepared by modifying a Prototech commercial electrode with Nafion ®. A 5% solution of Nafion ® was prepared by forming a solution of a commercial 5% solution of Nafion ® in about 90% isopropanol and 10% water. The solution was sprayed onto the catalyzed electrode surface. The spraying may be done at room temperature or at a higher temperature, and spraying has been done at up to about 140° C., below the reported Nafion ® creep temperature of above 160° C.

In a preferred spray application the solution was applied in layers. One layer was defined to be a spray of one-half second for every square centimeter of electrode area at a spray rate of about 0.13 /cm³/sec. It was found that a minimum of two layers are needed for good performance and that additional layers provide relatively small incremental increases in performance. A more dilute solution of Nafion ® may be used with a corresponding increase in the number of layers applied to the electrode. After spraying, the modified electrodes are air dried at ambient temperature for about 30 minutes and then placed in a vacuum oven at ambient temperature for further drying for 30 minutes. The electrodes are maintained in the vacuum and heated to 70° C. for about 30 minutes.

Electrodes for use at both the cathode and the anode may be prepared in accordance with the above procedure. It has been found, however, that improved results for the electrode to be used as the anode were obtained when the electrodes were maintained at about 140° C. during the spraying process.

Figure 2:
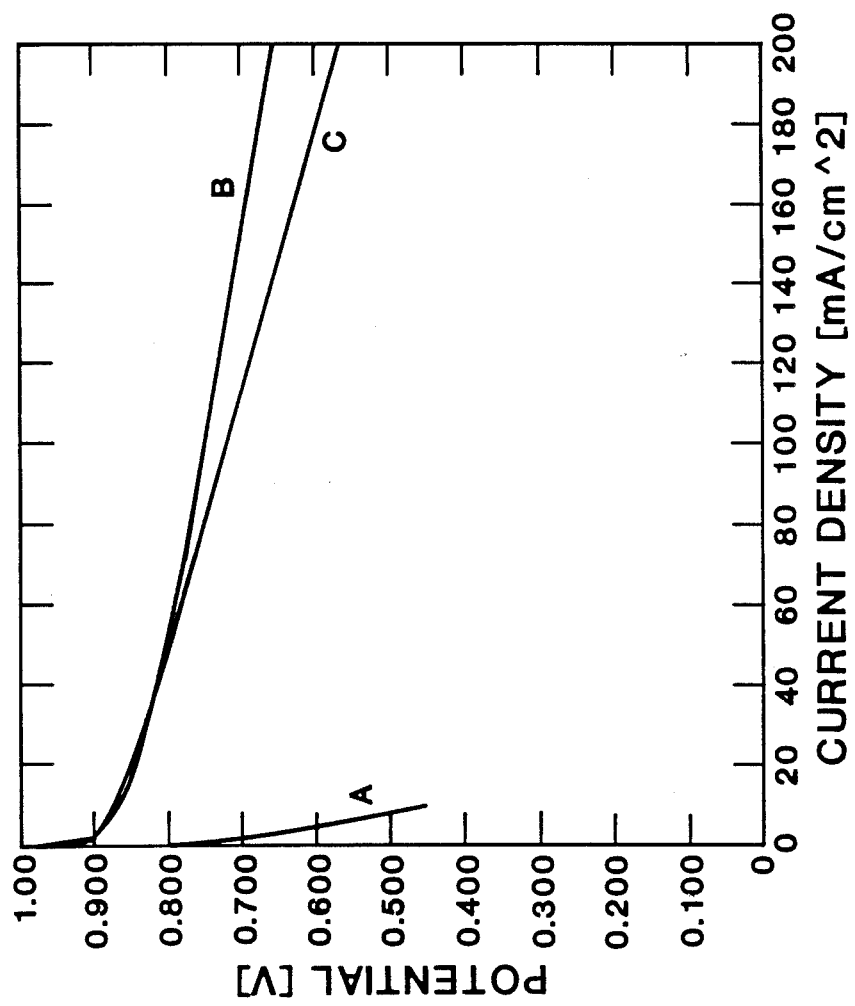
FIG. 2 is a graph of cell potential versus current density behavior comparing a fuel cell according to the present invention with prior art devices.

Referring now to FIG. 2, potential versus current density characteristics are shown for a fuel cell operating with a SPE membrane and gaseous reactants including hydrogen ($H_2$) as the fuel source and oxygen ($O_2$) as the oxidation source. The characteristics for three different electrodes are depicted:

Curve A An unmodified, commercially available electrode containing 0.35 mg Pt/cm² of electrode area.

Curve B The electrode of Curve A modified by introducing Nafion ® as the proton conductor.

Curve C Electrode areas prepared by pressing a composition of platinum, carbon, and teflon into the surface of a polymer electrolyte with a platinum loading of 4 mg/cm² of electrode area.

The Nafion ®-modified electrode clearly has the highest power density (voltage times current density) output. It is readily apparent from FIG. 2 that the modified electrode performs even better than an electrode containing more than ten times as much platinum. The unmodified electrode provides substantially unusable output power characteristics.

The invention hereinabove described thus enables a gaseous fuel cell to be formed using electrolytic materials of solid polymers and wherein a liquid electrolyte is not required. Further, a fuel cell may be constructed which is greatly reduced in cost from the cost of conventional SPE membrane-type fuel cells. The cost of a fuel cell fabricated in accordance with the present invention is accordingly determined more by the cost of the polymer materials, and particularly, the cost of Nafion ®, than the cost of the platinum catalyst.

While the above description has described a fuel cell embodiment having platinum as the catalytic particles supported by carbon particles in a porous gas diffusion electrode, it will be appreciated that various electrocatalytic materials might be substituted for platinum, more particularly, metals in the noble metal group of silver, gold, and the platinum group metals. Further, the preferred proton conducting materials are described to be a perfluorocarbon copolymer and $RuO_2$. However, other proton conducting materials are known, including the hydrogen uranyl phosphate family and the acid oxides of other transition metals, along with various polymeric materials.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use comtemplated. It is intended that the scope of the invention be defined by the claims appended hereto.

What is claimed is:

1. A method for treating porous gas diffusion electrodes having a catalyst loading less than 0.50 mg per square centimeter supported on carbon particles defining catalytic sites within said electrode for effective use with a solid polymer electrolyte membrane, comprising the steps of:

forming a solution containing a proton conductive material selected from a group consisting of a perfluorocarbon copolymer and ruthenium dioxide at a dilution effective for said proton conductive material to deposit adjacent said catalytic sites within said electrode; and dispersing said solution over said electrode in a manner effective for said proton conductive material to penetrate to within said electrode adjacent said catalytic sites.

2. A method according to claim 1, wherein said proton conductive material is a perfluorocarbon copolymer.

3. A method according to claim 2, wherein dispersing said solution over said electrode includes the steps of:

spraying said solution over said electrode to form a first application;

drying said first application; and spraying said solution over said electrode to form a second application.

4. A method according to claim 1, further including the step of drying said solution dispersed over said electrode at ambient conditions for a first determined time and thereafter drying said electrode in a vacuum for a second determined time.

* * * * *